US006473853B1

(12) United States Patent
Spiegel et al.

(10) Patent No.: US 6,473,853 B1
(45) Date of Patent: Oct. 29, 2002

(54) METHOD AND APPARATUS FOR INITIALIZING A COMPUTER SYSTEM THAT INCLUDES DISABLING THE MASKING OF A MASKABLE ADDRESS LINE

(75) Inventors: Christopher J. Spiegel, Carmichael; William A. Stevens, Jr., Folsom, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/337,369

(22) Filed: Jun. 21, 1999

(51) Int. Cl.[7] .................................... G06F 9/445

(52) U.S. Cl. ........................ 713/1; 713/100; 709/224; 710/10; 710/49; 710/262

(58) Field of Search ........................ 713/1, 2, 100; 709/220, 221, 222; 710/48, 10, 8, 14, 49, 260, 262, 266; 712/224

(56) References Cited

U.S. PATENT DOCUMENTS

| | | | | | |
|---|---|---|---|---|---|
| 5,361,492 | A | * | 11/1994 | Foureroy et al. | 395/800 |
| 5,473,775 | A | * | 12/1995 | Sakai et al. | 395/700 |
| 5,642,110 | A | * | 6/1997 | Raasch | 341/36 |
| 5,724,527 | A | * | 3/1998 | Karnik et al. | 710/128 |
| 5,768,496 | A | * | 6/1998 | Lidgett et al. | 714/25 |
| 5,857,116 | A | * | 1/1999 | Ayash et al. | 710/49 |
| 5,881,295 | A | * | 3/1999 | Iwata | 710/262 |
| 6,094,690 | A | * | 7/2000 | Lee | 710/10 |
| 6,154,837 | A | * | 11/2000 | Fudeyasu et al. | 713/2 |
| 6,226,736 | B1 | * | 7/2001 | Niot | 712/38 |

* cited by examiner

*Primary Examiner*—Jeffrey Gaffin
*Assistant Examiner*—Ri Jue Mai
(74) *Attorney, Agent, or Firm*—Mark V. Seeley

(57) ABSTRACT

A method of securing a boot process for a computer system enables a processor to boot from a location identified by a boot vector. The method includes the step of disabling masking of a maskable address line in response to a processor initialization event. In one embodiment, an apparatus includes a processor coupled to a memory by at least one maskable address line wherein the memory is storing a first initialization instruction. The apparatus includes a mask control wherein the mask control disables masking of the maskable address line before the processor attempts to access the first initialization instruction in response to an initialization event. In one embodiment a processor chipset gates a first address mask control with an inhibit bit to generate a second address mask control. The second address mask control is independent of the first address mask control when the inhibit bit is set to a first value. The processor chipset sets the inhibit bit to the first value in response to a processor initialization event. In various embodiments the initialization event include at least one of an application of power to the processor, a processor RESET, or a processor INIT.

7 Claims, 8 Drawing Sheets

METHOD AND APPARATUS FOR INITIALIZING A COMPUTER SYSTEM THAT INCLUDES DISABLING THE MASKING OF A MASKABLE ADDRESS LINE

FIELD OF THE INVENTION

This invention relates to the field of computer systems. In particular, this invention is drawn to methods and apparatus for initializing a computer system having maskable address lines.

BACKGROUND OF THE INVENTION

A computer system typically includes a processor such as a microprocessor that responds to an initialization event by initializing itself to a pre-determined state. The pre-determined state may vary depending upon the type of initialization event. The processor then typically begins executing initialization code located at a pre-determined location or address in memory. The process of initializing a computer system is often referred to as "booting" the computer system.

Some computer system architectures incorporate an address line masking function. In one embodiment, the address line masking function is used to ensure execution compatibility for program code designed for earlier generations of microprocessors having a smaller address space. Various embodiments achieve the address line masking function using address line masking circuitry internal or external to the microprocessor integrated circuit package.

Although the address line masking function is provided to ensure compatibility with program code designed to execute on earlier generation microprocessors, improper application of the address line masking function can result in the microprocessor attempting to boot from a alternate location identified by the masked address lines. Depending upon the contents of the alternate location, the computer system may be rendered inoperable, at least until a subsequent reboot from the correct memory address. Alternatively, enabling the computer system to boot from the alternate address can result in unauthorized initialization code being executed, thus posing a security risk such as enabling an unauthorized application to gain control of the boot process.

SUMMARY OF THE INVENTION

In view of limitations of known systems and methods, methods and apparatus for enabling a secure boot process of a computer system having maskable address lines is provided. In particular, one method includes the step of disabling masking of the maskable address line in response to a processor initialization event. In various embodiments the initialization event includes application of power to the processor, a processor RESET, or a processor INIT.

In one embodiment, an apparatus includes a processor coupled to a memory by at least one maskable address line wherein the memory is storing a first initialization instruction. The apparatus includes a mask control wherein the mask control disables masking of the maskable address line before the processor attempts to access the first initialization instruction in response to an initialization event.

In one embodiment, a processor chipset gates a first address mask control with an inhibit bit to provide a second address mask control. The second address mask control is independent of the first address mask control when the inhibit bit is set to a first value. The processor chipset sets the inhibit bit to the first value in response to a processor initialization event.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
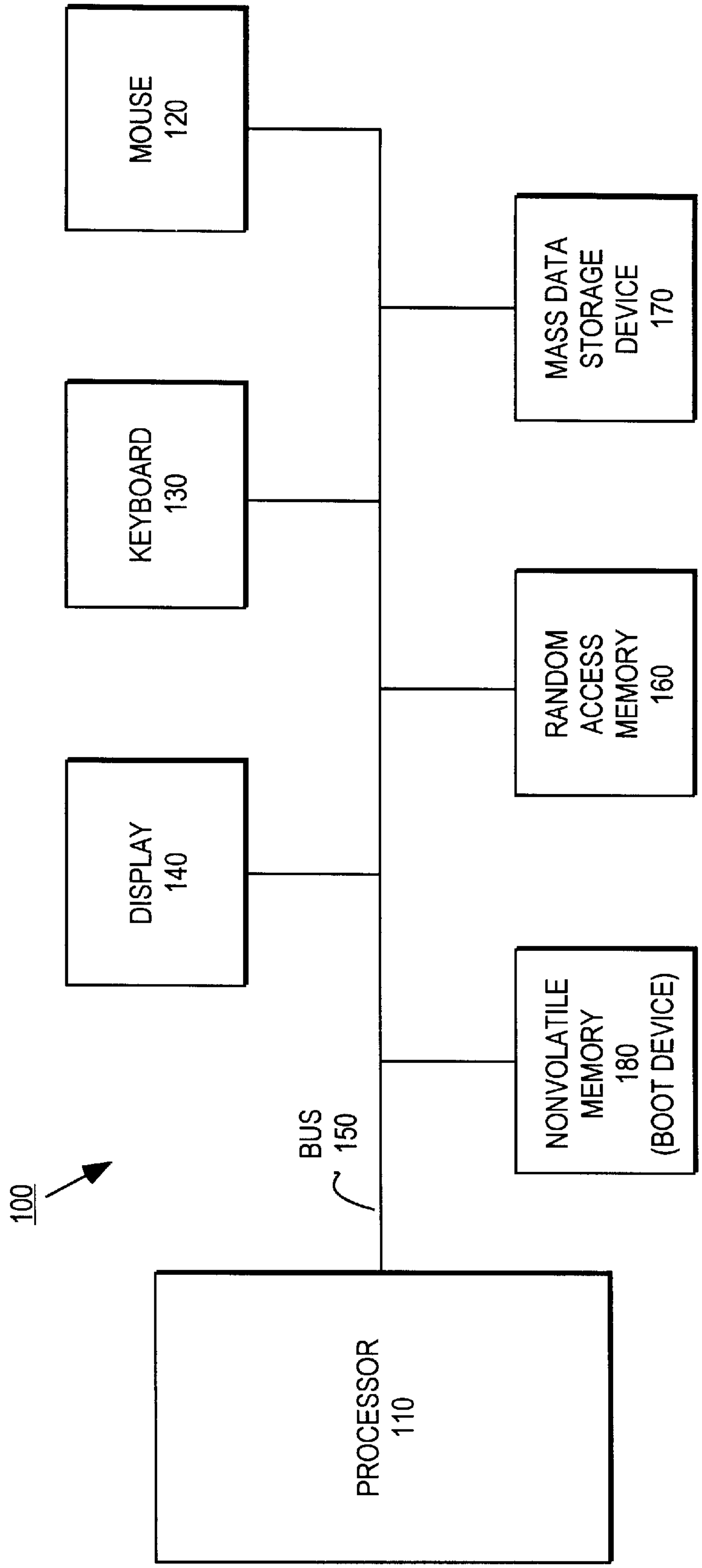
FIG. 1 illustrates a generic computer system architecture.

FIG. 1 illustrates a basic microprocessor-based computer system architecture. The computer system 100 includes processor 110. Input devices such as mouse 120 and keyboard 130 permit the user to input data to computer system 100. Information generated by the processor is provided to an output device such as display 140. Computer system 100 generally includes random access memory (RAM) 160.

Nonvolatile mass data storage device 170 is used to retain programs and data even when the computer system is powered down. In one embodiment nonvolatile mass storage device 170 is an electro-mechanical hard drive. In another embodiment nonvolatile mass storage device 170 is a semiconductor nonvolatile memory. Nonvolatile memory 180 stores initialization routines for the computer system. Mouse 120, keyboard 130, RAM 160, nonvolatile memory 180, and nonvolatile mass storage device 170 are communicatively coupled to processor 110 through one or more address and data busses such as bus 150.

Initialization of the computer system is performed upon power-up of the computer system or in response to hardware or software reset operations. Typically, the processor is designed to read a pre-determined memory location when the processor is reset or powered up. This pre-determined location is identified by a boot vector. The pre-determined memory location is typically an address in nonvolatile memory such as nonvolatile memory 180. The initialization routines are stored in a nonvolatile memory to ensure availability when the computer system is powered-up or reset.

The device storing the bootstrap loader and other minimal initialization procedures is referred to as the boot device. Nonvolatile memory 180 is the boot device in computer system 100. In one embodiment, nonvolatile memory 180 stores a bootstrap loader and other initialization routines such as power on self test (POST).

Nonvolatile memory 180 may include routines to enable communication between the processor and input/output devices of the computer system. In some computer systems these routines are collectively referred to as the Basic Input Output System (BIOS). The BIOS typically identifies components of the computer system, maps resources, determines the state of the computer system upon initialization, and provides support for an operating system so that software executing on the processor can communicate with input/output devices such as the keyboard, mouse, nonvolatile mass memory storage device, and other peripheral devices. In various embodiments, nonvolatile memory 180 is a semiconductor nonvolatile memory such as flash electrically rewritable nonvolatile memory.

Processors belonging to the Intel x86 family of microprocessors or to other microprocessor families designed to be compatible with Intel x86 microprocessors are frequently used in computer system designs. Intel microprocessors such as the x86 family of microprocessors have enjoyed a long history and widespread use. Each generation of the x86 family has offered the capability of supporting software originally designed for earlier generations of the microprocessor. As the microprocessors become more sophisticated over time, so too does the complexity of ensuring program code compatibility with previous generations of the microprocessors in addition to providing new features.

For example, one of the early Intel microprocessors, the Intel 8086, utilized a segmented memory architecture. Physical memory locations are identified using a 16 bit segment register and a 16 bit offset. A physical memory address is identified by shifting the contents of the segment register left four bits and adding the offset. This addressing mode is referred to as "real mode."

The 8086 only has 20 address lines (A0–A19). As a result, the microprocessor's physical address space is limited to approximately one megabyte. Depending upon the segment and offset values chosen, however, computation of the address could result in a situation such that 21 bits would be required for the address. Due to the physical limitations of the 8086, any address bits beyond the $20^{th}$ address line would have no effect. Thus for some segment and offset values, the physical address space of the 8086 effectively "wraps around" the bottom of memory even if the address internally could be uniquely expressed.

Some applications designed for the 8086 either deliberately used this feature or detected its occurrence and handled it in an application-specific manner. These and other applications designed for a microprocessor having the 20 bit physical address are referred to as legacy applications.

Figure 2:
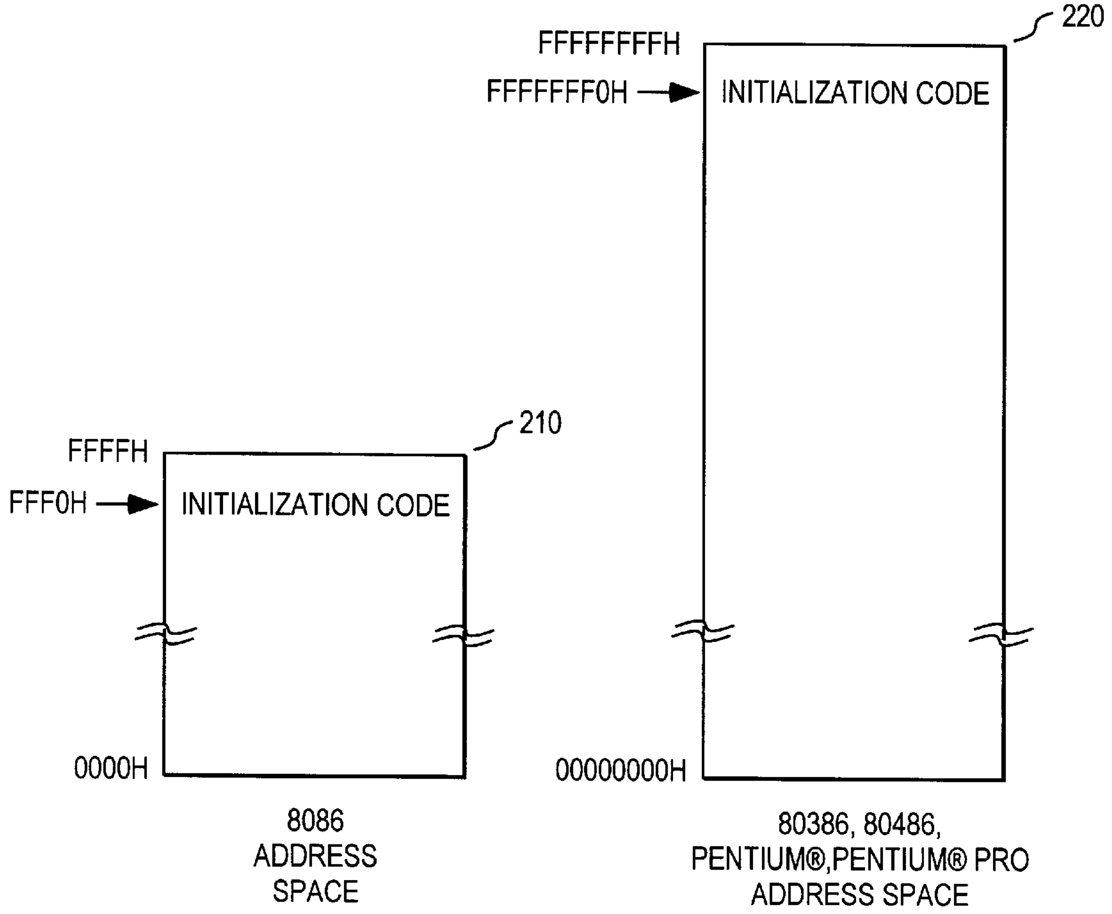
FIG. 2 illustrates the location of the first instruction of initialization code for processors having different addressable memory space.

Later generation microprocessors tended to have larger physical address spaces than the 8086. FIG. 2 illustrates the difference in physical address space between generations of the x86 family of microprocessors. As microprocessors became more sophisticated, the microprocessor's physical address bus tended to increase in size in order to support the larger address space. The Intel 80286 microprocessor, for example, includes 24 address lines. The Intel 80386DX microprocessor, for example, includes 32 address lines.

In addition, these later generation microprocessors provided a more sophisticated addressing mode referred to as "protected mode." In protected mode addressing, the segment registers are referred to as "selectors" and they serve as pointers to data structures that define segmentation limits and addresses. "Protected mode" enables applications to access more than one megabyte of memory.

Without proper handling, the presence of a $21^{st}$ address line could prevent legacy applications designed to take advantage of or to account for its non-existence from executing properly. Therefore, an address masking function was provided to ensure legacy applications could execute properly on computer systems designed around microprocessors having an effective address bus of more than 20 bits. In particular, computer systems designed around these later microprocessors typically included an address line masking function to disable address line A20 (the $21^{st}$ address line).

With respect to the x86 family of microprocessors, a mask control signal effectively masks the $21^{st}$ address line (A20) to force it to a pre-determined value (logical "0"). When enabled, the mask control signal ensured that a pre-determined value (i.e., "0") was always asserted for address line A20.

The address line masking function has been implemented in a number of ways. Computer systems designed around the Intel 80286 microprocessor or Intel 80386 microprocessor, for example, used masking circuitry external to the microprocessor. Logic external to the microprocessor effectively masked at least one address line used to access the memory in response to a mask control signal. The Intel 80486 microprocessor and the Intel Pentium® processor have address line masking circuitry internal to the microprocessor's integrated circuit package. The address line masking circuitry is responsive to a mask control signal applied to a pin of the microprocessor's integrated circuit package. In computer systems designed around these microprocessors, the mask control signal itself is typically provided by the keyboard controller.

Figure 3:
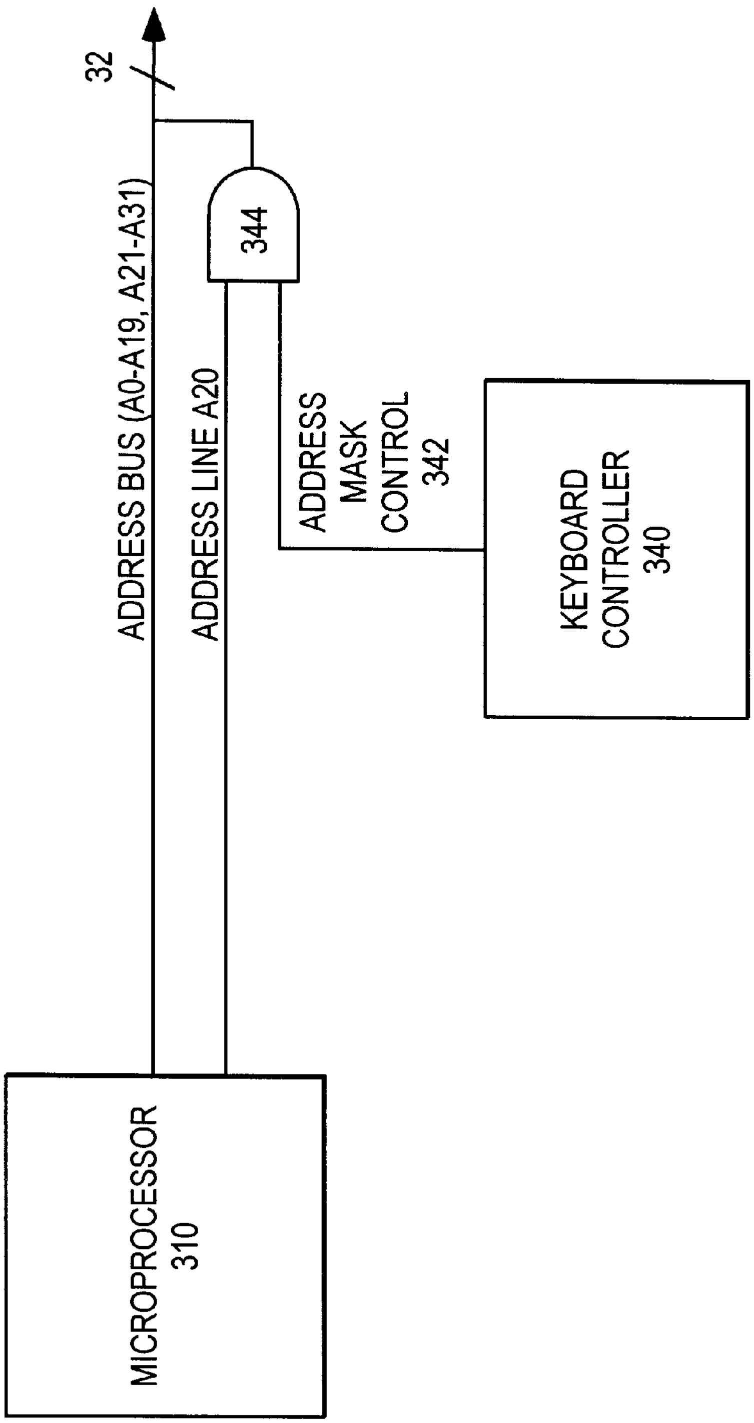
FIG. 3 illustrates one embodiment of address line masking logic for performing address line masking external to the microprocessor.

FIG. 3 illustrates one embodiment of mask control logic external to the microprocessor 310. The A20 address line of microprocessor 310 is logically combined with a mask control signal 342 provided by the keyboard controller 340 using logic 344 external to the microprocessor (e.g., an AND gate). This may be the case, for example, with the Intel 80286 processor and the Intel 80386 processor.

Figure 4:
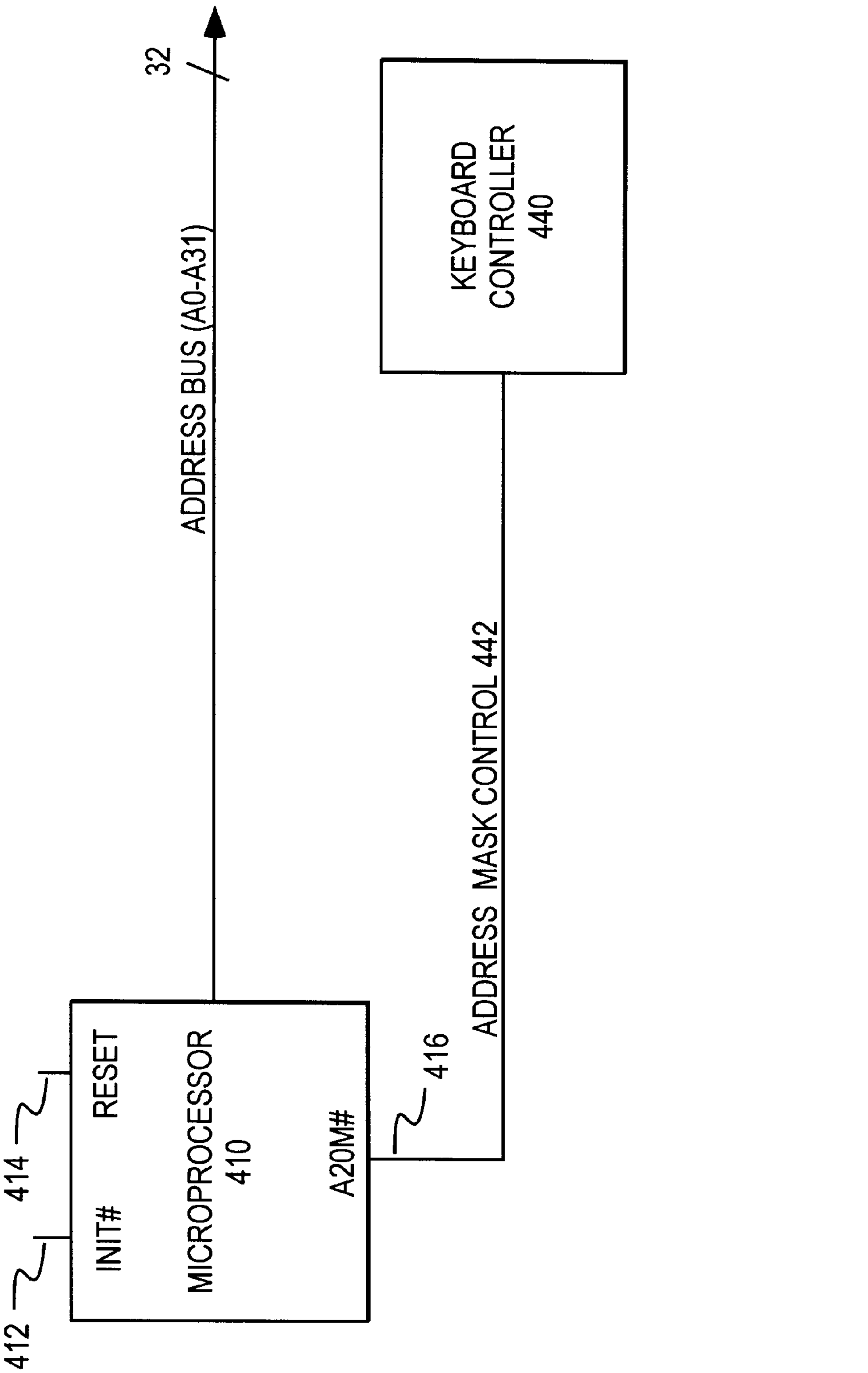
FIG. 4 illustrates a microprocessor having a mask control pin for enabling and disabling address line masking.

FIG. 4 illustrates an alternative embodiment where the masking logic is incorporated into the microprocessor 410. In particular, masking logic incorporated into the microprocessor 410 is controlled by mask control signal (A20M#) received by a pin 416 of the microprocessor's integrated circuit package. The Intel Pentium® processor, for example, provides an A20M# pin for controlling the masking logic incorporated into the integrated circuit package. Although illustrated as an active low input, the mask control signal may also be active high. The address mask control signal is typically provided by the keyboard controller 440.

The state of the address mask control signal upon computer system initialization is important to ensure a secure booting process. Microprocessors are designed to initialize themselves to a pre-determined state in response to an initialization event. The pre-determined state may vary depending upon the particular microprocessor and the type of initialization event. Security of the system may well depend upon the certainty that the microprocessor reaches the pre-determined state.

For example, one type of initialization event is a "power-up" or the application of power to the microprocessor. Referring to FIG. 4, another type of initialization event is the assertion of the RESET# pin 414 of a microprocessor's integrated circuit package (i.e., performing a RESET). For Intel x86 family microprocessors, these types of initialization events cause the microprocessors to perform a "hardware reset" of the processor and an optional built-in self-test.

For Intel architecture microprocessors, a hardware reset sets each of the processor's registers to a known state and places the processor in real address mode. A hardware reset also invalidates the internal caches, translation lookaside buffers, and branch target buffers. The microprocessor begins executing initialization code at a pre-determined location.

Some members of the x86 family have an INIT# pin 412 as part of the microprocessor integrated circuit package. Assertion of the INIT# pin 412 is another type of initialization event. Assertion of the INIT# pin (i.e., performing an INIT) invokes a response similar to that of a hardware reset, however, the internal caches and certain other elements are left unchanged. An INIT provides a method for switching from protected mode to real mode while maintaining the contents of the internal caches.

Typically the first instruction fetched and executed following a hardware reset is located near the top of the processor's uppermost physical address. The first instruction fetched by the x86 family of microprocessors, for example, is 16 bytes from the top of memory. Referring to FIG. 2, the 8086 microprocessor is designed to begin executing initialization code at location FFFF0H as indicated by addressable space 210. In contrast, 80386, 80486, Pentium®, Pentium® Pro, and Pentium® II processors ordinarily start executing initialization code at location FFFFFFF0H as indicated by addressable space 220. Each location is 16 bytes from the top of the processor's respective addressable range of memory. Some of these processor designs may enable re-definition of the boot vector through strapping options. The default boot vector, however, typically points to a location near the top of the physical address space.

The first instruction is stored in nonvolatile memory to ensure availability upon powering up the computer system. For processors having one megabyte or less of addressable space, ordinary real address mode may be used to access this location. For processors having more than 1 megabyte of addressable memory space, the pre-determined location is ordinarily beyond the one megabyte addressable range of the processor while in real address mode.

The Intel x86 family of microprocessors utilize a CS register and an EIP register to determine the location of the next instruction for execution. The CS register includes a segment selector portion and a base address portion. The base address is normally formed by shifting the 16 bit segment selector value four bits to the left to produce a 20 bit base address.

For microprocessors capable of addressing larger memory ranges, however, more than 20 address bits are required to access the upper range of memory. In one embodiment, this is accomplished during a hardware reset by initializing the base address portion of the CS register with a value otherwise inaccessible during real mode addressing. The address is then calculated by adding this base address to the segment offset rather than shifting the base address by four bits and adding it to the segment offset. For example, in one embodiment, the segment selector portion is loaded with F000H and the base address portion is loaded with FFFF0000H. The EIP register containing the offset is set to FFF0H. Thus the starting address is formed by adding the base address (FFFF0000H) to the offset (FFF0H), i.e., FFFF0000H+FFF0H=FFFFFFF0H.

The first time the CS register is loaded with a new value after a hardware reset, the processor will follow the normal rule for address translation in real address mode (i.e., CS base address=CS segment selector * 16). Thus a far jump, a far call, or the invocation of an interrupt will result in "normal" (i.e., address range less than one megabyte) real mode operation. Typically the instruction located at the predetermined memory location is a far jump identifying a memory location within nonvolatile memory containing additional boot code.

In one computer system architecture, a portion of the BIOS is stored at the pre-determined location. Thus the boot vector points to a portion of the BIOS. The BIOS typically includes the power on self test code, interrupt service routines, device service routines, and configuration tables describing the computer system to the operating system.

If the address masking function is enabled during the hardware reset or INIT, the microprocessor may attempt to access an instruction at an alternate location rather than the pre-determined location. For example, depending upon whether the masking function masks only address line A20 or A20–A31, the microprocessor may attempt to access alternate address FFEFFFF0H or 000FFFF0H instead of FFFFFFF0H.

If the alternate location contains an invalid instruction (opcode), the computer system may be rendered inoperable at least until masking is disabled and the computer system is rebooted. If the alternate location contains a valid instruction, the processor may begin executing code other than the proper initialization code. Alternatively, by defining the action (e.g., error handler) to take in response to an invalid opcode, another application may be able to seize control of the boot process even if the opcode at the alternate location is invalid. The user may not realize that normal initialization procedures have been circumvented. Generally, the computer system may be inadvertently exposed to a security risk if the address line masking function is enabled during initialization.

Figure 5:
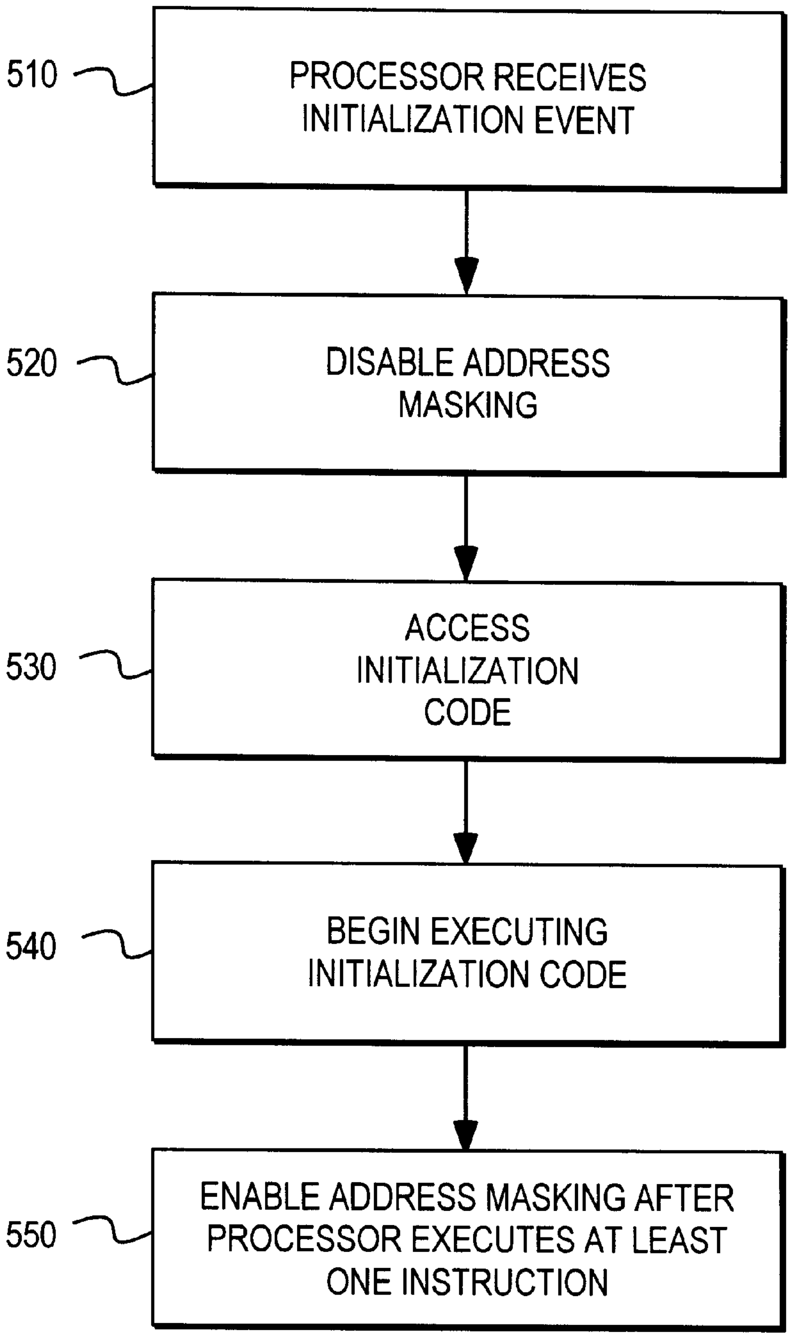
FIG. 5 illustrates a method of booting a computer system having maskable address lines.

FIG. 5 illustrates one embodiment of a more secure method for booting a computer system having maskable address lines. In step 510, the processor receives an initialization event. In step 520, address line masking is disabled in response to the initialization event to ensure that the address lines are not masked. In step 530, the processor accesses the initialization code. In step 540, the processor begins executing the initialization code.

Address line masking can be enabled again once the appropriate initialization steps have been performed. In one embodiment, the initialization code performs validity testing on itself to ensure that the code has not been altered. In another embodiment, the initialization code performs steps to "lock down" the nonvolatile memory that the initialization code is stored in to prevent unauthorized code updates. The particular steps taken before the address line masking is re-enabled may vary from system to system. Generally, at least one instruction will be executed before the address line masking function is re-enabled. Thus in step 550, address line masking is enabled after executing at least one instruction.

There are numerous methods for implementing the mask inhibit function. Generally, however, as one component of a secure boot process, the mask control signal must be inhibited in response to an initialization event and re-enabled only after the boot process is secure. In one embodiment, the mask control signal from the keyboard controller is inhibited by a supporting chipset of the microprocessor.

Figure 6:
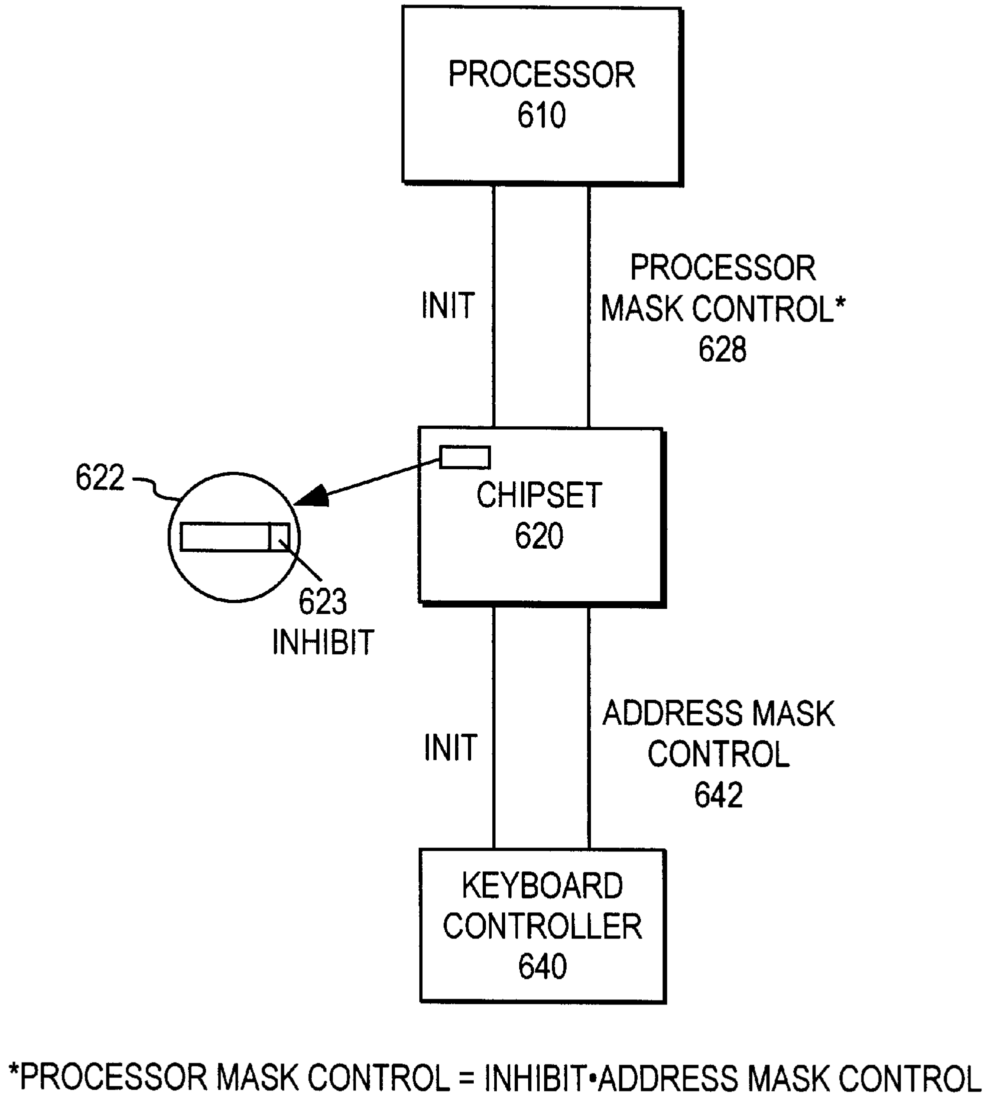
FIG. 6 illustrates one embodiment of a computer system including a microprocessor and accompanying chipset.

FIG. 6 illustrates a microprocessor 610 and components of a supporting chipset 620. Computer system architectures designed around a particular microprocessor often use chipsets specifically designed to support the selected microprocessor. The chipset typically provides bus control functions and microprocessor control signals. In one embodiment, the chipset generates the processor mask control signal 628 in accordance with an inhibit bit 623 and the address mask control signal 642 provided by keyboard controller 640.

The chipset inhibits the mask control signal 640 from the keyboard controller by gating the signal with the inhibit bit 623 stored in a chipset register 622. In response to an initialization event, chipset 620 initializes this inhibit bit to a first value to disable the mask control signal 628. As long as the bit is set to the first value, processor mask control 628 will be set to a predetermined value to prevent masking independent of the value of address mask control signal 642 and thus address mask control signal 642 is inhibited.

The inhibit bit may be used in conjunction with combinatorial logic to disable masking. The combinatorial logic depends upon whether the mask control signal 628 is active high or active low. In one embodiment having an active high processor mask control signal 628, mask control is accomplished by logically ANDing the inhibit bit and the address mask control 642 to produce the processor mask control signal 628 (e.g., inhibit bit="0" to disable masking). In an alternative embodiment having an active low processor mask control signal 628, mask control is accomplished by logically ORing the inhibit bit and the address mask control 642 to produce the processor mask control signal 628 (e.g., inhibit bit="1" to disable masking).

Once the initialization process is secure, the inhibit bit 623 can be set to a second value to enable the keyboard controller address mask control 642 to pass. In one embodiment, inhibit bit 623 is automatically set to a second value in response to the reading of one of the chipset registers. The second value ensures that the mask control signal 642 is no longer inhibited such that processor mask control signal 628 corresponds to address mask control signal 642 from the keyboard controller.

Figure 7:
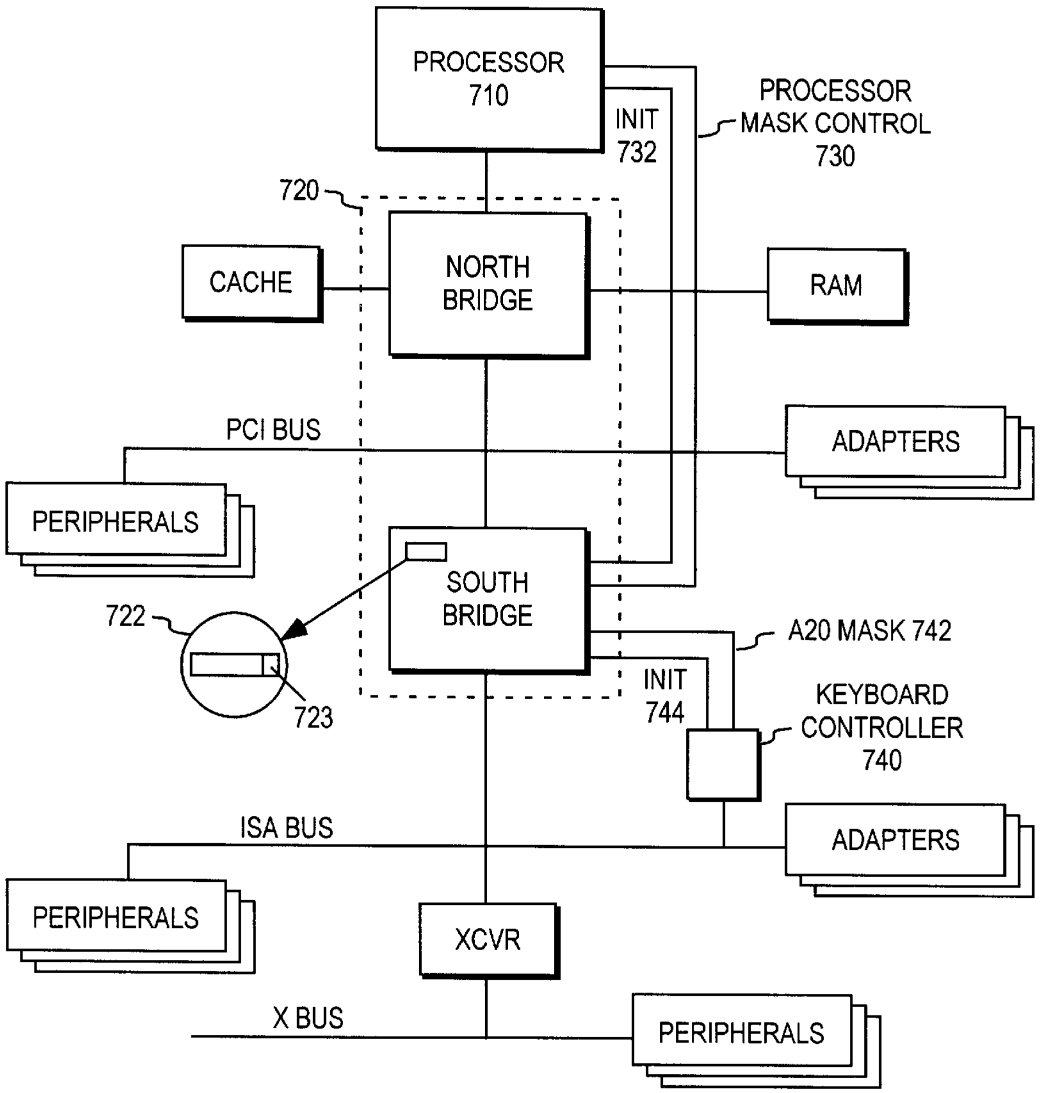
FIG. 7 illustrates another embodiment of a computer system including a microprocessor and an accompanying chipset.

FIG. 7 illustrates another embodiment of a computer system. Keyboard controller 740 provides the INIT 744 and the A20 mask control signal 742 to the "south bridge" of chipset 720. The south bridge provides an INIT 732 and a processor mask control signal 730 to processor 710. The south bridge includes register 722 storing an inhibit bit 723. The inhibit bit may be logically combined with the A20 mask control signal 742 to produce the processor mask control signal 730. The combinatorial logic depends upon whether the processor mask control signal 730 is active high or active low. In one embodiment, the inhibit bit 723 is logically ANDed with the A20 mask control signal 742 to produce the processor mask control signal 730 (i.e., active high, inhibit bit="0" disables masking). In an alternative embodiment, the inhibit bit 723 is logically ORed with the A20 mask control signal 742 to produce the processor mask control signal 730 (i.e., active low, inhibit bit="1" disables masking).

Figure 8:
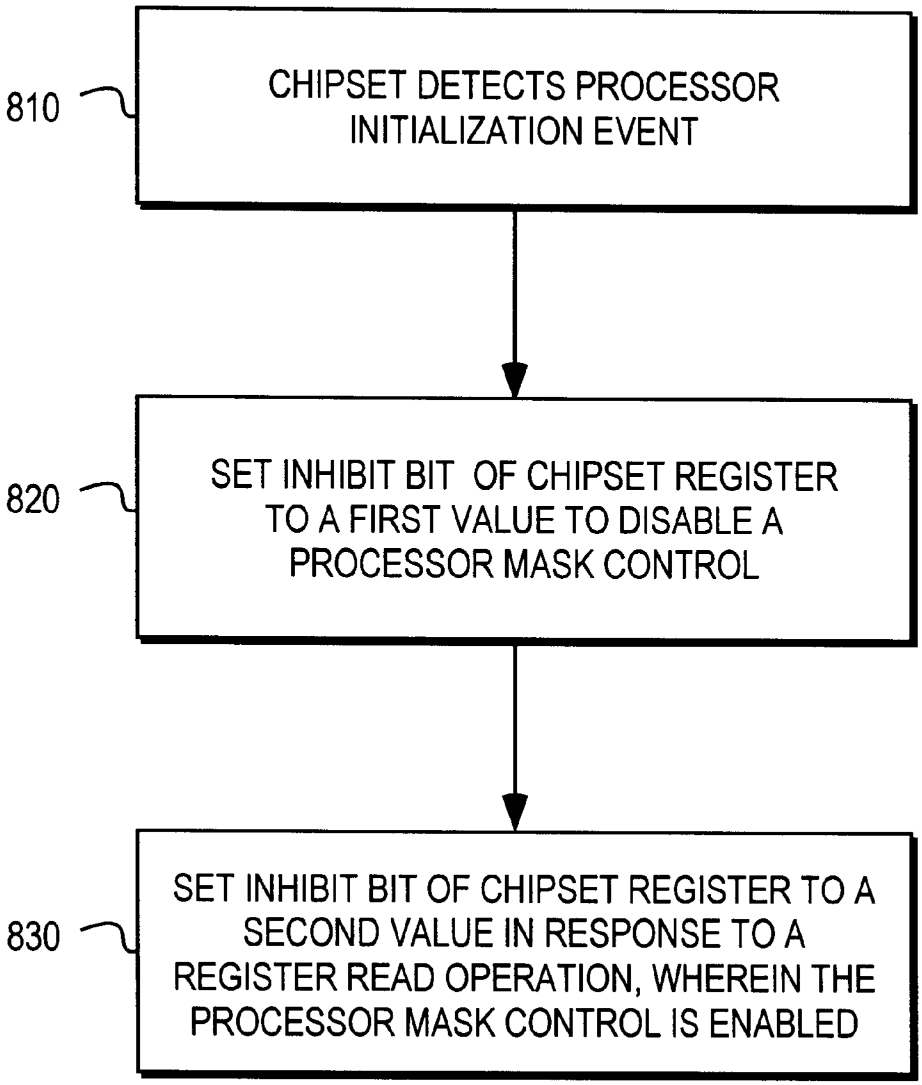
FIG. 8 illustrates one embodiment of the application of the method of FIG. 5.

FIG. 8 illustrates one embodiment of the method of FIG. 5 as applied to the computer system of FIGS. 6 and 7. In particular, the chipset detects the processor initialization event in step 810. Typically the chipset is capable of sensing the processor initialization events including the application of power (a power up), a reset, or a processor INIT.

In response to the detection of a processor initialization event, the chipset sets an inhibit bit to a first value in step 820. The processor mask control signal is generated as a logical combination of the inhibit bit and the mask control signal from the programmable keyboard controller. When the inhibit bit is set to the first value, the resulting processor mask control signal is set to a state to ensure no address masking independent of the mask control signal from the programmable keyboard controller. In one embodiment, the inhibit bit is a portion of a register in the chipset.

The processor is now capable of accessing the predetermined address in response to the initialization event. At some point during the initialization process, the processor reads a chipset register to determine features of the chipset or the computer system. Step 830 sets the inhibit bit to a second value in response to a read access of the chipset register. When the inhibit bit is set to the second value, the processor mask control signal corresponds to the mask control signal provided by the keyboard controller. This approach has the advantage that the BIOS is not relied upon for enabling or disabling the processor mask control signal, thus security is provided by the hardware rather than the BIOS.

Methods and apparatus to enable secure booting of a computer system having maskable address lines have been described. A method includes the step of disabling address line masking in response to an initialization event. A processor RESET, INIT, and power up are various types of initialization events. In one embodiment, the address line masking is re-enabled after the processor executes at least one instruction. An apparatus for providing the address mask control signal includes an integrated circuit. The integrated circuit gates a first mask control signal with an inhibit bit to generate a second mask control signal. The integrated circuit initializes the inhibit bit to a first value in response to the initialization event to ensure that the second mask control signal does not mask any address lines. In one embodiment, the integrated circuit sets the inhibit bit to a second value in response to the reading of a register of the integrated circuit. The second mask control signal corresponds to the first mask control signal when the inhibit bit is set to the second value.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method for enabling a processor to boot from a location identified by a boot vector, comprising:

- the processor receiving an initialization event;
- disabling masking of a maskable address line of the processor in response to the initialization event;
- the processor executing initialization code that is stored in a nonvolatile memory;
- the initialization code locking the nonvolatile memory to prevent unauthorized code updates, and performing validity testing on itself to ensure that the code has not been altered; and
- enabling masking of the maskable address line after the initialization code has performed the validity testing.

2. The method of claim 1 wherein the initialization event includes the application of at least one of i) power, ii) a RESET signal, and iii) an INIT signal to the processor.

3. An apparatus comprising:

- a processor chipset, wherein the processor chipset gates a first address mask control with an inhibit bit to generate a second address mask control, wherein the second address mask control is independent of the first address mask control when the inhibit bit is set to a first value, wherein the processor chipset sets the inhibit bit to the first value in response to a processor initialization event.

4. The apparatus of claim 3 wherein the processor initialization event includes the application of at least one of i) power, ii) a RESET signal, and iii) a processor INIT signal.

5. The apparatus of claim 3 further comprising:

a processor coupled to a plurality of address lines, wherein the chipset sets the inhibit bit to a second value after the processor executes at least one initialization instruction, wherein the second address mask control corresponds to the first address mask control when the inhibit bit is set to the second value, wherein at least one of the plurality of address lines is masked in accordance with the second address mask control.

6. The apparatus of claim 5 wherein the chipset sets the inhibit bit to the second value when a chipset register is read.

7. The apparatus of claim 5 further comprising:

a nonvolatile memory storing initialization code, wherein the nonvolatile memory is locked to prevent modification before the chipset sets the inhibit bit to the second value.

* * * * *